March 2, 1954
C. M. PHILLIPS
2,670,586
PNEUMATIC ATTACHMENT FOR GRAIN HARVESTING MACHINES
Filed Nov. 7, 1951
3 Sheets-Sheet 1
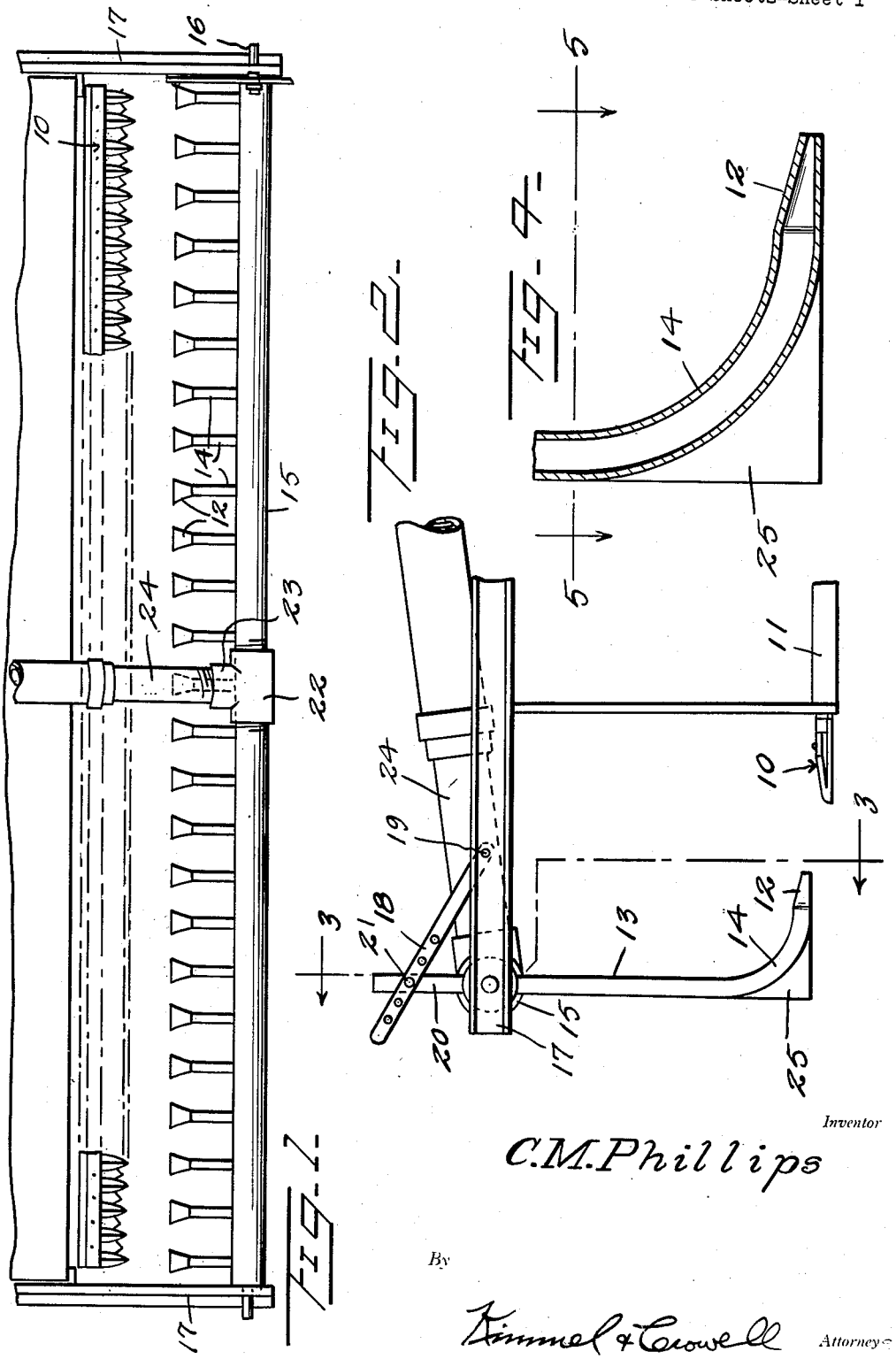
Inventor
C. M. Phillips
By Kimmel & Crowell Attorneys March 2, 1954 — C. M. PHILLIPS — 2,670,586
PNEUMATIC ATTACHMENT FOR GRAIN HARVESTING MACHINES
Filed Nov. 7, 1951 — 3 Sheets-Sheet 2
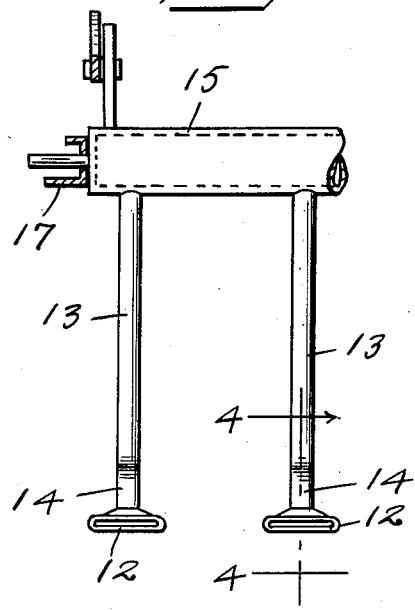
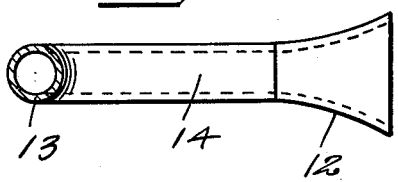
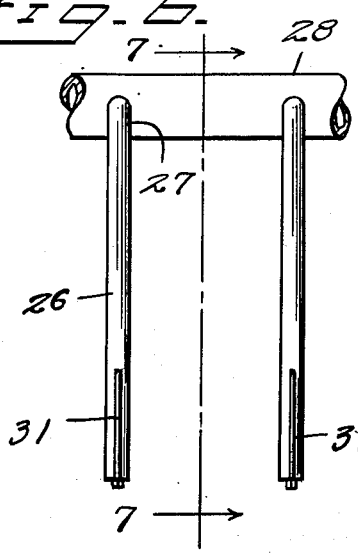
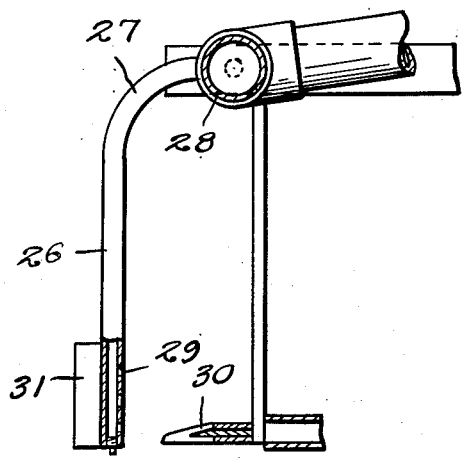
INVENTOR
C. M. Phillips
BY Kimmel & Crowell
ATTORNEYS March 2, 1954   C. M. PHILLIPS   2,670,586
PNEUMATIC ATTACHMENT FOR GRAIN HARVESTING MACHINES
Filed Nov. 7, 1951   3 Sheets-Sheet 3
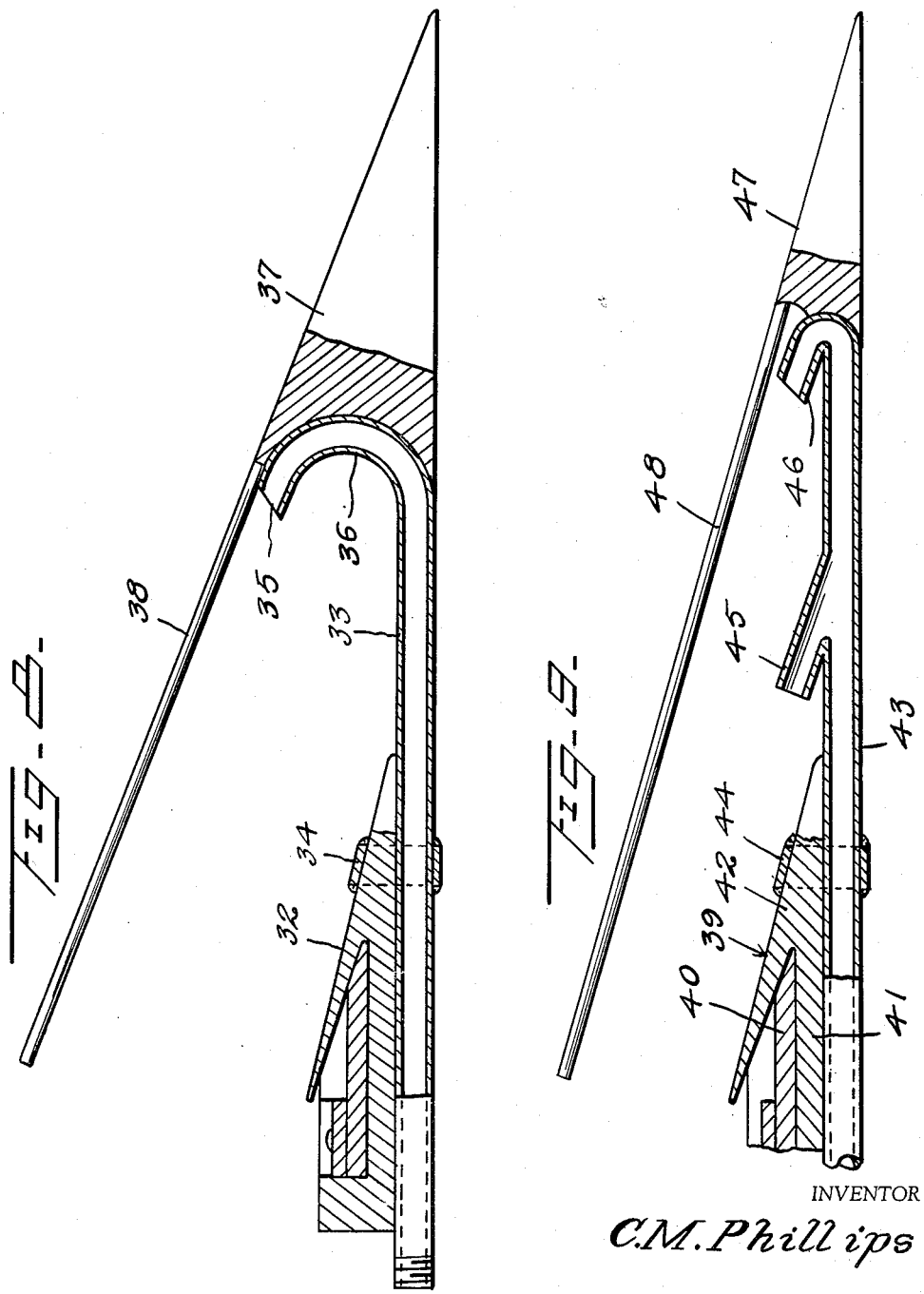
INVENTOR
C. M. Phillips
BY Kimmel & Crowell
ATTORNEYS Patented Mar. 2, 1954

2,670,586

UNITED STATES PATENT OFFICE 2,670,586

PNEUMATIC ATTACHMENT FOR GRAIN HARVESTING MACHINES

Curt M. Phillips, Rudyard, Mont., assignor of twenty per cent to Julius J. Wuerthner, Great Falls, Mont.

Application November 7, 1951, Serial No. 255,159

2 Claims. (Cl. 56—158)

This invention relates to grain harvesting machines.

An object of this invention is to provide an attachment for a grain harvesting machine which is adapted to be attached in advance of the cutter bar and which is designed to force the grain into the cutter.

Another object of this invention is to provide in combination with the cutter bar of a harvesting machine of air nozzles supported in advance of the cutter bar and directed toward the latter for blowing the straw and loose grain over the cutter bar and onto the platform or conveyor conventionally disposed at the rear of the cutter bar.

A further object of this invention is to provide a device of this kind which may be applied to a harvesting combine without alteration of the parts thereof.

With the above and other objects in view, my invention consists in the arrangement, combination and details of construction disclosed in the drawings and specifications, and then more partciularly pointed out in the appended claims.

In the drawings:

Figure 1 is a plan view of a grain saving attachment for a harvesting machine constructed according to an embodiment of this invention.

Figure 2 is an enlarged detailed end elevation of the device showing a portion of the harvesting machine.

Figure 3 is a fragmentary sectional view taken on the line 3—3 of Figure 2.

Figure 4 is an enlarged fragmentary sectional view taken on the line 4—4 of Figure 3.

Figure 5 is a fragmentary sectional view taken on the line 5—5 of Figure 4.

Figure 6 is a fragmentary front elevation of a modified form of this invention.

Figure 7 is a sectional view taken on the line 7—7 of Figure 6.

Figure 8 is a fragmentary longitudinal section of another modification of this invention.

Figure 9 is a fragmentary longitudinal section of a further modification of this invention.

Referring to the drawings and first to Figures 1 to 5, inclusive, the numeral 10 designates generally a conventional reciprocating cutter bar which forms a part of a conventional combine or harvesting machine. The machine includes a platform 11 disposed rearwardly of the cutter bar 10 which is disposed in a position to receive the grain including the straw and grain particles which are cut by the cutter bar 10. In practice the platform 10 is constructed in the form of an endless conveyor moving toward one end of the cutter bar 10 and delivering the cut material to another portion of the harvesting machine for separating the grain from the straw.

In order to provide a means whereby the standing grain will be directed toward the cutter bar 10 and also that the cut material will be forced rearwardly onto the platform 11, I have provided a plurality of air nozzles 12 which are secured to depending pipes 13 formed at their lower ends with rearwardly curved extensions 14. The pipes 13 are vertically disposed and are connected to a horizontally disposed manifold 15. The manifold 15 is formed at the opposite ends thereof with studs 16 engaging through supporting bars 17, and the manifold 15 with the nozzles 12 depending therefrom is adapted to be rocked and secured in adjusted position by means of an apertured lever or bar 18 which is pivotally secured as at 19 to the supporting bar 17.

An upstanding bar 20 is secured to the manifold 15, and a manifold adjusting bolt 21 extends through a selected opening of the bar 18 and through the upstanding bar or arm 20. The manifold 15 includes a T coupling 22 which has extending from the central branch 23 thereof an air supply pipe 24. The air supply pipe 24 is extended rearwardly and is connected to a conventional source of air pressure supply (not shown) such as a fan or blower.

The nozzles 12 are of rearwardly flared configuration and are disposed in a plane slightly above the cutter bar 10 as shown in Figure 2. A blade or plate 25 is secured to the convex side of the curved extension 14 and constitutes a leading or spreading member for dividing the stalks of grain prior to the engagement of the stalks with the cutter bar 10.

Referring now to Figures 6 and 7 there is disclosed a modified form of this invention embodying a vertically disposed pipe 26 formed with an upwardly and rearwardly curved upper portion 27 which is secured to and communicates with a horizontally disposed manifold 28. The lower portion of the pipe 26 is provided with a series of vertically spaced apart openings 29 comprising jet openings which face rearwardly so as to direct an air blast rearwardly over the cutter bar 30.

Referring now to Figure 8 there is disclosed another modification of this invention. The cutter bar 32 is of conventional construction and an air supply pipe 33 projects horizontally forwardly from the cutter bar 32 being secured to the lower side of the cutter bar 32 by means of a band or strap 34 which may be welded or otherwise firmly secured to the forward portion of the stationary guard comprising the stationary portion of the cutter bar 32. The band or strap 34 may be welded to the guard and to the pipe 33. The pipe 33 constitutes a supporting means for the jet 35, and the jet 35 is connected with the pipe 33 by means of an upwardly and rearwardly curved extension 36.

A forwardly projecting guard or blade 37 is welded or otherwise secured to the forward convex side of the extension 36 and an upwardly and rearwardly directed bar or guard member 38 projects upwardly and rearwardly from the nose or guard member 37. There will be as many jet nozzles 35 as there are guard members formed on the cutter member 32.

Referring now to Figure 9 there is disclosed another modification of this invention. A cutter bar 39 of conventional construction which includes a movable cutter blade 40 and a stationary cutter bar 41 having guard members 42 projecting forwardly therefrom. A horizontally disposed and forwardly extending air supply pipe 43 is secured to the lower side of the fixed or stationary guard member 41 projecting in parallel relation to the guard member 42. The pipe 43 is secured to the bar 41 and the guard 42 by means of a welded band or strap 44. The pipe 43 has disposed on the upper side thereof an upwardly and rearwardly directed nozzle 45, and the forward end of the pipe 43 terminates in an upwardly and rearwardly directed nozzle 46.

A guard member or nose 47 is welded or otherwise fixedly secured to the forward end of the pipe 43 and an upwardly and rearwardly directed bar or rod 48 is fixed to the guard member 47 and extends upwardly and rearwardly over the nozzles 45 and 46 and the cutter member 39.

In the use and operation of this device the manifold 15 is disposed forwardly of the cutter member 10 being supported by the supporting bars 17. The nozzles 12 will be disposed forwardly of the cutter member 10 and in a plane slightly above the cutter member.

As the machine moves forwardly through the standing grain the grain will be divided by the blade 25 and the depending pipes 13, and the air blasts created by the nozzles 12 will blow the grain rearwardly, and when the grain has been cut by the cutter bar 10, this grain including the straw will be blown onto the platform 11 from which the grain and straw is removed by any suitable conventional means for harvesting the grain.

The angular relation of the air blast emanating from the nozzles 12 may be adjusted by the adjusting bar 18, and it will be understood that the air supply pipe 24 may include a flexible connection (not shown) so that the manifold 15 with the depending nozzles may be angularly adjusted as may be desired.

The nozzles 12 which provide the air outlets at the lower ends of the ducts 13 are elongated in a direction longitudinally of the manifold 15 as shown in Figures 1 and 3, and are disposed slightly above and forwardly, with respect to the line of draft of the cutter bar 10. The nozzles or air outlets 12 are so positioned in alignment longitudinally of the manifold that a ribbon of air is produced, which acts against the grain stalks and bends them over below the cutter bar. Furthermore, the ribbon of air produced acts not only to blow the grain on to the platform 11 but also to blow lodged grain on the cutter bar from the cutter bar on to the platform. The manifold 15, being pivotally mounted between the supporting structure 17 by means of the end journals 16, is angularly adjustable to adjust the positions of the air nozzles 12 relative to the cutter bar 10 and, consequently, to adjust the direction of the ribbon of air with respect to the cutter bar 10. It is to be particularly noted that the nozzles or air outlets 12 are disposed, as can best be seen from Figure 2, slightly above the horizontal plane of the cutter bar 10.

The blades or plates which provide a guide blade means on the ducts forwardly of the air outlets or nozzles 12, have their lower ends disposed coplanar with the lower ends of the ducts 13 and their leading edges disposed in advance of the lower ends of the ducts to act as plows or similar guide members for guiding the ducts through standing grain stalks.

What is claimed is:

1. For use with a grain harvesting machine having a cutter bar and platform means associated with the cutter bar and disposed rearwardly thereof with respect to the line of draft for receiving the severed grain; an attachment for feeding grain to the cutter bar comprising a manifold disposed above and parallel to the cutter bar and being substantially coextensive in length therewith, a supporting structure carried by the machine and extending forwardly of the cutter bar at both ends thereof, means pivotally mounting the manifold between the supporting structure so that the manifold is angularly adjustable, means carried by the manifold and the supporting structure for securing the manifold in angularly adjusted positions, a plurality of spaced apart side by side aligned ducts radially extending from the manifold in fluid communication therewith, said ducts depending from the manifold to a point slightly above the horizontal plane of the cutter bar and having air outlets at their lower ends, said air outlets being formed at right angles to the longitudinal axes of the ducts and confronting the cutter bar and being elongated and in alignment in a direction longitudinally of the manifold and lying slightly above the cutter bar to produce a ribbon of air that acts against the grain stalks at the cutter bar and also acts on grain lodging on the cutter bar to blow such grain onto the platform, means connecting the manifold with a source of air under pressure whereby the manifold and ducts are supplied with air and guide blade means vertically carried by the ducts forwardly of the air outlets therein and extending forwardly of the lower ends of the ducts, the guide blade means having lower edges lying in the same plane as the lower ends of the ducts and having leading edges vertically disposed in advance of the lower ends of the ducts to guide the ducts through the standing grain stalks.

2. An attachment as claimed in claim 1, wherein said manifold has journals formed on its opposite ends, said journals being rotatably mounted in openings in the supporting structure to provide the pivotal mounting means and said means for securing the manifold in angularly adjusted positions includes members on the manifold radially extending therefrom and complemental means extending from the supporting structure and means adjustably connecting said members and said complemental means.

CURT M. PHILLIPS.

References Cited in the file of this patent

UNITED STATES PATENTS

| Number | Name | Date |
|---|---|---|
| 689,800 | Hafermehl | Dec. 24, 1901 |
| 859,602 | Green | July 9, 1907 |
| 1,122,375 | Engle | Dec. 29, 1914 |
| 1,794,658 | Walsh | Mar. 3, 1931 |
| 1,900,269 | Altgelt et al. | Mar. 7, 1933 |